United States Patent
Graham

(10) Patent No.: US 10,422,367 B2
(45) Date of Patent: Sep. 24, 2019

(54) SHEARING FASTENER FOR SEALING A FASTENER HOLD

(71) Applicant: Caterpillar Inc., Peoria, IL (US)

(72) Inventor: Curtis J. Graham, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 277 days.

(21) Appl. No.: 15/375,888

(22) Filed: Dec. 12, 2016

(65) Prior Publication Data
US 2018/0163762 A1    Jun. 14, 2018

(51) Int. Cl.
*F16B 19/00* (2006.01)
*F16B 31/02* (2006.01)

(52) U.S. Cl.
CPC .......... *F16B 19/008* (2013.01); *F16B 31/021* (2013.01)

(58) Field of Classification Search
CPC .... F16B 35/005; F16B 19/008; F16B 31/021; H01R 4/36; H01R 43/04; H01R 4/307
See application file for complete search history.

(56) References Cited

U.S. PATENT DOCUMENTS

| 4,261,402 A | 4/1981 | Stanaitis |
| 4,659,267 A | 4/1987 | Uno et al. |
| 4,850,771 A | 7/1989 | Hurd |
| 5,071,301 A | 12/1991 | Engelhardt et al. |
| 5,127,687 A | 7/1992 | Guiler |
| 6,665,922 B2 | 12/2003 | Schultz |
| 7,438,334 B2 | 10/2008 | Terry et al. |
| 2006/0093456 A1 | 5/2006 | Delcourt |
| 2009/0260489 A1* | 10/2009 | Siong .................. F16B 23/0007 81/460 |
| 2016/0298670 A1* | 10/2016 | Diniz ................... F16B 35/005 |

FOREIGN PATENT DOCUMENTS

| GB | 953794 | 4/1964 |
| GB | 2 291 156 | 1/1996 |

* cited by examiner

*Primary Examiner* — Jacob J Cigna
*Assistant Examiner* — Lee A Holly
(74) *Attorney, Agent, or Firm* — Finnegan, Henderson, Farabow, Garrett & Dunner, LLP

(57) ABSTRACT

A shearing fastener for sealing a fastener hole in a work piece includes a shank, a plug, and a fastener head. The fastener head is disposed along the upper end of the shank, while the lower end of the shank further includes a transition section that tapers inward and intersects with an upper surface of the plug at a neck. The plug has a threaded outer surface and an outer diameter greater than the shank. The plug engages the threaded bore of the fastener hole when inserted therein. The shank is configured to shear across the neck and separate the shank from the plug when the fastener head is torqued above a threshold torque. The plug is retained within the threaded bore of the fastener hole to seal the lower end of the fastener hole, forming a repaired work piece.

16 Claims, 3 Drawing Sheets

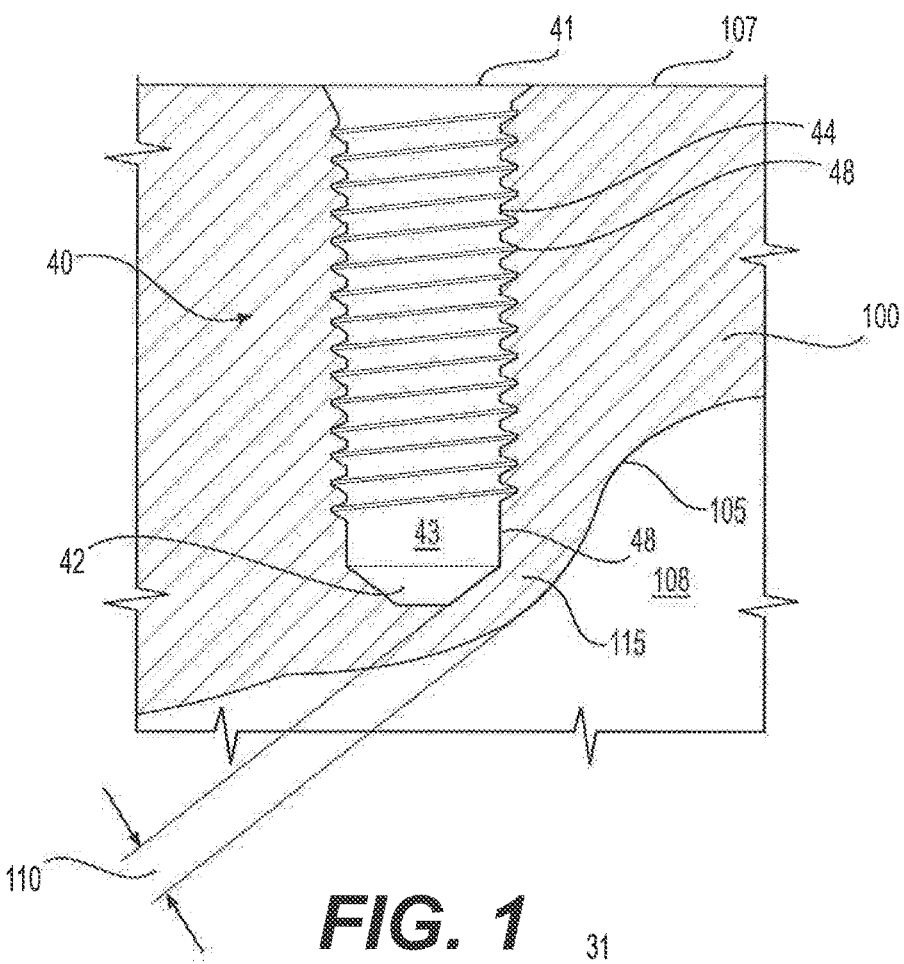
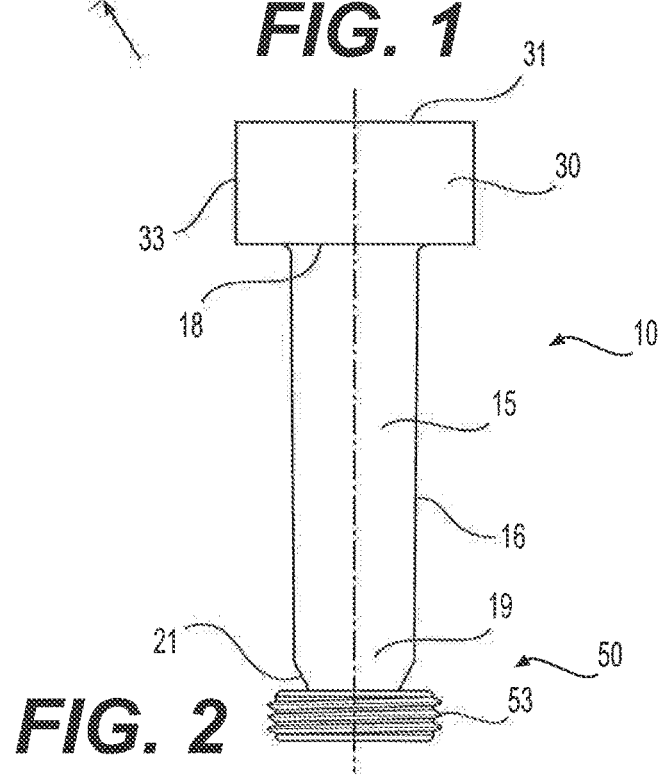

SHEARING FASTENER FOR SEALING A FASTENER HOLD

TECHNICAL FIELD

The present disclosure relates generally to a fastener, and more particularly to a shearing fastener for sealing a fastener hole.

BACKGROUND

The ability to repair a flaw within the interior of a fastener hole is sometimes limited because of the restricted access within the interior of the hole and the inability to insert tooling to conduct repairs. In the context of a cast work piece, core shifts and other casting irregularities can sometimes create thin wall sections adjacent to fastener holes. These thin wall sections are prone to leaks, either by way of material failure at the flaw location or because of porosity of the work piece material. This can result in an irreparable work piece and thus a complete loss of the casting.

Repairing thin wall sections of a work piece generally entails a drilling and tapping process. The thin wall section is drilled, tapped, and then a set screw is inserted into the newly-formed hole to seal the section and prevent leaks. This process is feasible where the flaw is accessible. However, for thin wall sections adjacent to fastener holes and internal to the work piece, access is limited for tooling to repair the flaw both from within the hole and from the interior of the work piece.

The disclosed shearing fastener is directed to address these and other problems.

SUMMARY OF THE INVENTION

In one aspect, the present disclosure is directed to a shearing fastener for sealing a fastener hole including a shank, a plug, and a fastener head. The shank has an upper end, a lower end, and an outer diameter. The fastener head is disposed along the upper end of the shank and the lower end of the shank includes a transition section that tapers inward to a neck that intersects with an upper surface of the plug. The plug has a threaded outer surface and an outer diameter that is greater than the outer diameter of the shank.

In another aspect, the present disclosure is directed to a method of sealing a fastener hole in a work piece that includes threading a shearing fastener into a threaded bore of the fastener hole, the shearing fastener including a shank, a plug, and a fastener head. The shank has an upper end, a lower end, and an outer diameter. The fastener head is disposed along the upper end of the shank, while the lower end of the shank further includes a transition section that tapers inward to a neck disposed along an upper surface the plug. The plug has a threaded outer surface that engages the threaded bore and an outer diameter that is greater than the outer diameter of the shank. The method further includes rotating the fastener head of the shearing fastener until its plug bottoms out in the threaded bore. Then torque is applied to the fastener head sufficient to shear a neck of the shearing fastener to separate its shank from the plug. The shank is then removed from the threaded bore, retaining the plug within the threaded bore.

In yet another aspect, the present disclosure is directed to a repaired work piece having a fastener hole with a sealed bore made by a process including the steps of threading a shearing fastener into a threaded bore of the fastener hole. The shearing fastener includes a shank, a plug, and a fastener head. The shank also has an upper end, a lower end, and an outer diameter. The fastener head is disposed along the upper end of the shank, while the lower end of the shank further includes a transition section that tapers inward to a neck disposed along an upper surface the plug. The plug has a threaded outer surface that engages the threaded bore and an outer diameter that is greater than the outer diameter of the shank. The fastener head of the shearing fastener is rotated until its plug bottoms out in the threaded bore. A torque is applied to the fastener head sufficient to shear a neck of the shearing fastener to separate its shank from the plug, after which the shank is removed from the threaded bore and the plug is retained within the threaded bore.

BRIEF DESCRIPTION OF THE DRAWINGS

FIG. 1 is a cross-sectional view of an exemplary work piece with a fastener hole and thin wall section at the bottom of the fastener hole;

FIG. 2 is a side elevation view of an exemplary disclosed shearing fastener;

DETAILED DESCRIPTION

Figure 3:
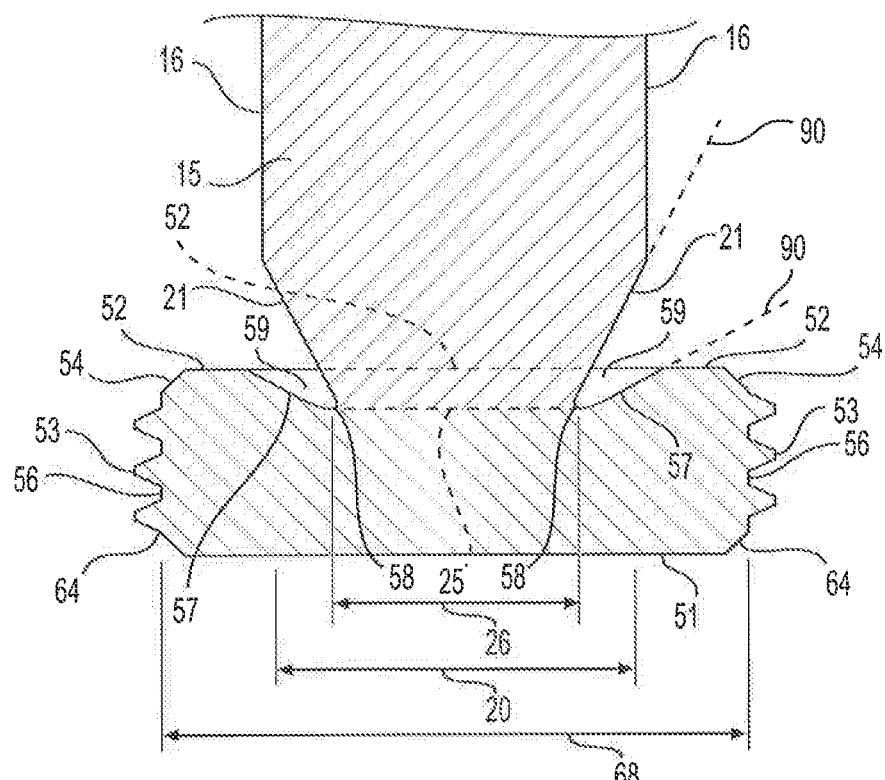
FIG. 3 is a cross-sectional view of the exemplary shearing fastener of FIG. 2.

FIG. 1 illustrates an exemplary fastener hole 40 disposed within a work piece 100. In various exemplary implementations of the apparatus and method according to this disclosure, the work piece may be any part having a fastener hole, including an engine block. The fastener hole 40 has an open upper end 41, interior walls 44, and an interior volume 43. The fastener hole 40 is generally a tapped hole extending through an upper surface 107 of the work piece 100 with threads 45 along its interior walls 44. A tap is used to create the threads 45, where the tap sometimes stops short of a lower end 42 of the fastener hole. In these instances, a smooth wall section 48 can be present along the lower end 42 of the hole 40. The length of threads 45 along the walls 44 of the fastener hole 40 and the size of its interior volume 13, however, enable the fastener hole 40 to receive a threaded fastener therein. To receive the threaded fastener, the fastener hole 40 has a defined diameter, depth, and thread pitch that are all complementary to the threaded fastener.

Figure 5:
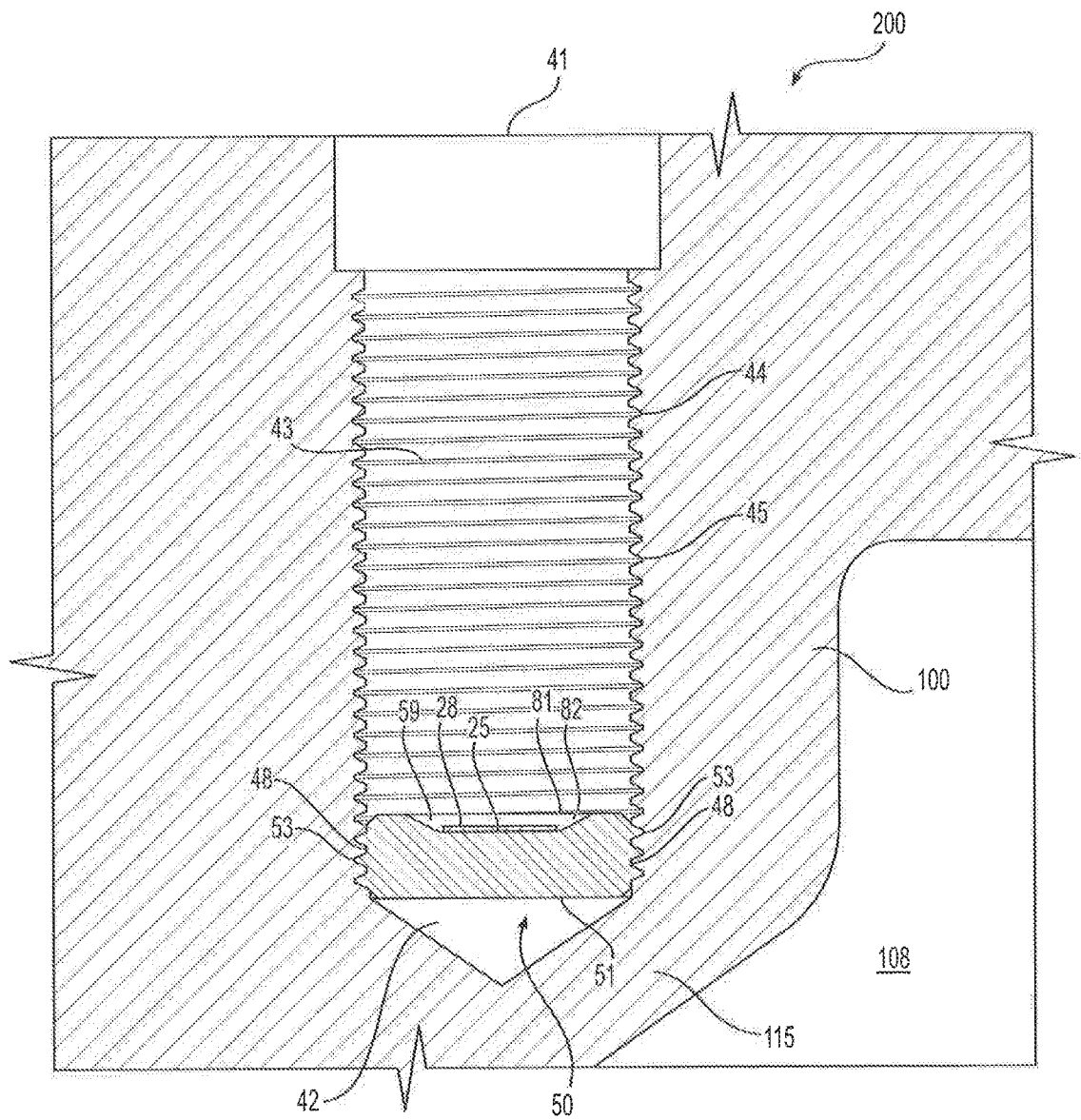
FIG. 5 is a cross-sectional view illustrating an exemplary repaired work piece using a disclosed method of operating the shearing fastener of FIG. 2.

An exemplary fastener hole 40 of the present disclosure is a fastener hole with an enclosed lower end 42 as presented in FIGS. 1 and 5. Enclosed fastener holes, or blind fastener holes, do not pass completely through the work piece 100. While these types of fastener holes 40 are illustrative of potential applications for the apparatus and techniques disclosed herein, the disclosure is not limited to sealing enclosed or blind fastener holes.

Creating fastener holes in a work piece can create flaws if the holes are improperly located or the work piece has shifted during manufacturing. In particular, fastener holes 40 such as shown in FIG. 1 may be drilled too closely to an interior cavity 108 within the work piece. This locates the lower end 42 of the fastener hole 40 a short distance away from an interior wall 105 within the work piece, resulting in a thin wall section 115 between the interior cavity 108 and the fastener hole 40. These thin wall sections 115 may have a dimension 110 (i.e. a material thickness) smaller than design limits allow. This can lead to premature structural failure at this location or fluid pass-through by way of material porosity and short travel distance.

FIG. 2 illustrates a side view of an exemplary shearing fastener of the present disclosure. The shearing fastener 10 includes a shank 15, a plug 50, and a fastener head 30. The shank 15 is an elongated member with an upper end 18 and a lower end 19. In one embodiment, the shank 15 forms an elongated cylindrical member with an outer profile 16 having a smooth surface. The outer profile 16 of the shank 15 has an outer diameter that may be uniform along its length and configured to be less than the diameter of the fastener hole 40. This allows the outer profile of the shearing fastener 10 to be inserted into the fastener hole without the shank 15 engaging the threads 45 of the fastener hole 40, while also being sized to be received without interference into the interior volume 43 of the fastener hole 40.

Figure 4:
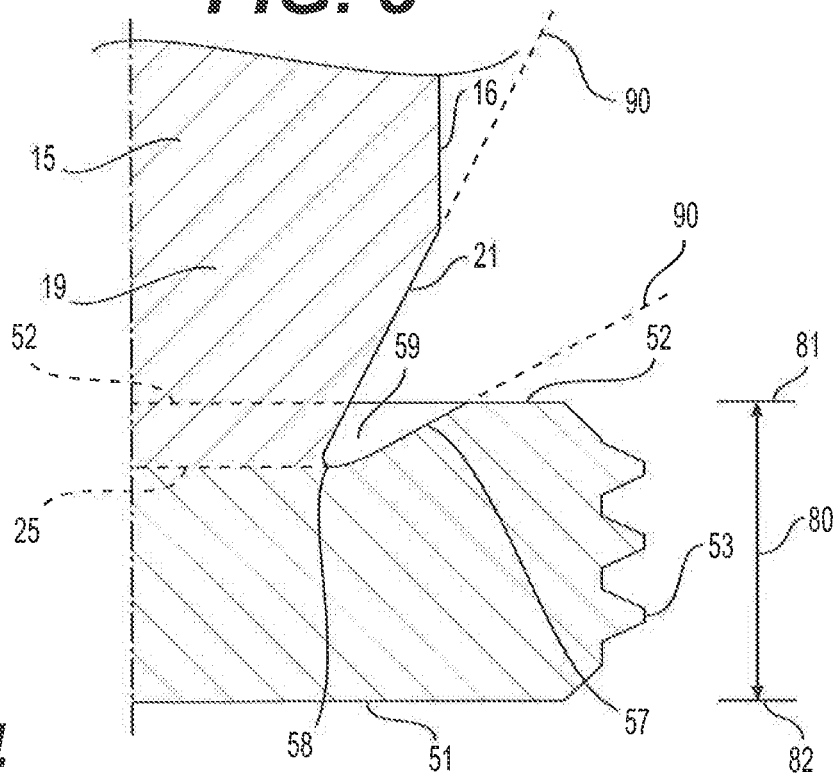
FIG. 4 is a close-up of the cross-sectional view of the exemplary shearing fastener of FIG. 2.

As shown in FIGS. 2-4, the lower end 19 of the shank 15 includes a transition section 21 that tapers inward to a neck 25 that intersects the plug 50. The plug 50 extends outward and has an outer diameter 68 that is greater than the diameter of the shank 20 along its length. The plug 50 has a threaded outer surface 53 along its outer diameter that is configured to engage the threads 45 of the fastener hole 40. In this manner, the threaded outer surface 53 of the plug 50 is configured to engage the threads 45 of a fastener hole 40 while the smaller-diameter shank 15, with its smooth outer profile, is received within the hole without engaging the hole threads 45. The shank 15 therefore connects to the plug 50 and drives the plug 50 into the fastener hole 40 by appropriate rotation of the shank 15.

Along the upper end 18 of the shank is a fastener head 30 that has an upper surface 31. The fastener head 30 is configured to connect to a torquing tool, such as a wrench, driver, or another suitable tool for applying a rotation to the fastener head 30. In one example, the upper surface 31 of the fastener 10 may have a depression forming a hexagonal socket, a Phillips head socket, a torx socket, or the like. Alternatively, the sides of the fastener head 30 may be faceted to allow a wrench, socket, or similar torquing tool to apply a rotation and torque to the outer surface 33 of the fastener head. The rotation applied to the fastener head 30 via the particular tool imparts a rotation on the shank 15 and a like rotation on the plug 50, driving the plug 50 into the fastener hole 40 when the complementary threads of the fastener hole 40 and plug 50 are aligned. As the head 30 is rotated, the plug 50 rotates and is drawn into the interior volume 43 of the hole 40.

FIGS. 3 and 4 show side section views of the exemplary shearing fastener 10 of the present disclosure at the intersection of the shank 15 and the plug 50. The lower end 19 of the shank 15 has a transition section 21 that tapers inward, reducing the diameter of the shank 20 until intersecting with the plug 50. The transition section 21 tapers the diameter of the shank 20. In one embodiment, the transition section 21 may taper the shank 15 equally around the periphery of the shank 15 and linearly until the shank 15 intersects an upper surface 52 of the plug 50. The intersection between the shank 15 and the plug 50 forms a neck 25, which has a neck diameter 26. The neck diameter 26 is smaller than the diameter of the shank 15 and the transition section 21 tapers the lower end 19 of the shank to the neck 25. Therefore, the neck 25 has a smaller cross-sectional area than the cross-sectional area of the shank 15 along its upper end 18.

The plug 50 further includes an upper surface 52, a height 80, an upper extent 81, and a lower extent 82. The upper surface 52 of the plug in one embodiment is not planar and not coincident with the upper extent 81 of the plug across its surface area. Rather, the upper surface 52 may include a recess 59 that extends into the plug 50 and below its upper extent 81. The upper surface 52 may be aligned with the upper extent 81 of the plug 50 along the outer periphery of the upper surface 52, while the recess 59 extends downward into the plug at the intersection of the transition section 21 and the plug upper surface 52. The transition section 21 of the shank 15 intersects the plug 50 at the neck 25. The neck 25 is disposed within the recess 59 and below the upper extent 81 of the plug. Therefore the neck 25 is disposed within the interior of the plug's height 80 (i.e. below its upper extent 81).

Additionally, the plug 50 may have a round outer profile 56 with a threaded outer surface 53. The threads 53 extend around the round outer profile 56 of the plug and along the height 80 of the plug. Along the upper corner 54 and lower corner 64 of the plug, material may be removed so the corners 54, 64 are chamfered. This eliminates right-angle transitions between the outer profile 56 of the plug and the upper surface 52, and between the outer profile 56 and a lower surface 51. The chamfered corners 54, 64 facilitate insertion of the plug 50 into the open upper end 41 of the fastener hole 40, and further prevent the plug 50 from catching any burrs or flaws within the interior of the fastener hole 40 while being threaded therein.

Along the upper surface 52 of the plug is the recess 59. The recess 59 is a cavity formed between the transition section 21 of the shank 15 and an angled surface 57 extending downward from the upper extent 81 of the plug 50 along its upper surface 52. The transition section 21 of the shank 15 and the angled surface 57 converge at a radius 58 along the perimeter of the neck 25. This radius 58 forms an acute angle or "sharp" angle that is configured to create a stress riser or stress concentration when the fastener 10 is subjected to physical load. A stress riser is an area that experiences particularly high stresses or concentrations of stress when a part is subjected to load. The stress riser created by the radius 58 therefore forms a designed weak point across the neck 25, and therefore a weak point between the shank 15 and the plug that can be used as a designed separation plane. In particular, the radius 58 extending around the periphery of the neck 25 at the smallest diameter section of the transition section 21 (i.e. the neck) forms a shear plane across the neck. This is a designed failure location and is used to separate the shank IS from the plug 50 at the neck 25 when the shank is subjected to a threshold torque. This shear plane extends across the neck 25 and may be disposed within the recess 59 below the upper extent 81 of the plug 50.

Described in more detail, the neck 25 is a designed failure location between the shank 15 and the plug 50 such that the two separate when a threshold stress develops at the radius 58 and across neck 25. In a preferred embodiment, the designed stress riser, at the radius 58 at the intersection of the transition section 21 and the plug 50, develops a higher concentration of stress than the rest of the fastener 10 when the fastener is subjected to load at the fastener head 30. The placement of the radius 58 adjacent to the small-diameter neck 25 forms a designed shear plane across the neck 25. The shank 15 and the plug 50 separate across the neck 25 when sufficient shear load develops at this location. This facilitates a particular mode of failure, in which the shank 15 will separate from the plug 50 and the failure point will be across the neck 25 and below the plug upper extent 81. Any barbs or burrs that inadvertently develop at the neck 25 at failure will therefore be maintained within the recess 59 and not protrude above the plug upper extent 81. This is particularly useful when maximizing available space in a fastener hole by preventing protruding burrs from consuming any useful space.

The shear force used to separate the shank 15 from the plug 50 is generally introduced by a torque applied to the fastener head 30. The threshold torque, or torque necessary to shear the shank 15 from the plug 50 at the neck 25, will be dependent on several factors. These include primarily the ultimate stress of the fastener material and the diameter of the neck 25. The choice of material used to form the fastener (i.e. stainless steel, etc.) and the method in which the material is manufactured (i.e. forged, etc.) will dictate the ultimate stress. The designed diameter of the neck 25 for failing at a specific shear load (i.e. threshold torque) will be dependent on the diameter of the fastener hole 40, which will limit the neck diameter 26. Therefore, the threshold torque required to separate the shank 15 from the plug 50 will be based on the dimensions, material, and design limitations of the particular application.

With respect to forming the shearing fastener 10 of the present disclosure, several methods are contemplated. In one process, the recess 59 is formed in the upper surface 52 of the plug using a milling process. In an embodiment, a carbide bit of a milling machine, or another type of bit driven by another suitable machine, is plunged at an angle into the area forming the recess 59 between the plug 50 and shank 15 to remove material. At the same time, this same cutting process forms the radius 58 around the periphery of the neck 25. The radius 58 is a tight bend or sharp radius as described above, forming the stress riser around the perimeter of the neck 25. At the same time, the milling operation also forms the transition section 21 at lower end 19 of the shank 15 and the angled surface 57 in the upper surface 52 of the plug. The bit, having a substantially conical cutting surface, forms the radius 58 at the same time the recess 59 and transition section 21 are cut. The conical bit, shown by the conical cut lines 90 in FIG. 3, defines the profile of the recess 59, the transition section 21, and the radius 58 in one operation. While this is one method of manufacturing, other operations are also contemplated for forming these features. The disclosed milling operation is but one process that is not intended to be limiting.

Along with the disclosed milling operation, the shearing fastener of the present disclosure may also be formed from an existing threaded fastener. In one embodiment, an existing threaded fastener can be used as the basis for forming the smooth shank, threaded plug, and intersection between the two. The existing fastener is turned on a lath or milling machine to remove the threads from its shank and to reduce its diameter. This process is conducted along the shank and below its fastener head, and stops short of a distal end of the shank. This leaves a section of threads remaining for forming the new plug. Once turned, a cutting bit can be plunged into the intersection of the smooth shank and the plug to form the radius and recess. The result is a smooth surface shank and a threaded plug with the radius and transition section described above.

In an alternative embodiment, the shearing fastener of the present disclosure may be formed from scratch using a rolled forging technique. The rolled forging is heat treated and machined to form the shank and plug. The rolled forging is rolled using a tool to form the threads of the plug. Machining operations can then form the recess and radius.

INDUSTRIAL APPLICABILITY

The disclosed shearing fastener may be applicable to any work piece having a fastener hole. This includes work pieces where a fastener hole is adjacent to an interior cavity within the work piece, and a thin wall section exists between the bottom of the fastener hole and the cavity. The thin wall section occurring at the bottom of a threaded fastener hole may be subject to failure or may create potential locations for leakage. Example work pieces include engine blocks with fastener holes improperly located adjacent to interior coolant passages. This can occur when technicians drill fastener holes in the block and misplace their locations. This can also result from an improper design or shifts during the block casting process, in which irregularities in the block are formed. In any case, when this occurs and a fastener hole is too close to an interior passage, the block is generally scrapped and a new block must be cast.

The disclosed shearing fastener can be installed into a threaded fastener hole of a machine component using standard tools. The shearing fastener facilitates the repair of a thin wall section at the bottom of the fastener hole by sealing the lower end of the fastener hole with a plug portion of the fastener configured to break off from the rest of the shearing fastener at a threshold torque. By sealing the hole, any thin wall section between the fastener hole and an interior cavity in the work piece will not result in fluid pass-through or leakage into the fastener hole. The following description sets forth an exemplary implementation of a repair method using the disclosed shearing fastener.

As shown in FIG. 5, when a work piece 100 is inspected and either an interior failure or thin wall section 115 is found adjacent to a fastener hole 40, the shearing fastener 10 of the present disclosure can be used to seal the lower end 42 of the fastener hole 40. The plug 50 of the shearing fastener 10 is ideally positioned within the lower end 42 of the hole 40. This retains sufficient volume 43 within the hole 40 and thus a sufficient number of threads 45 along the walls 44 of the hole 40 to grip a subsequent fastener inserted above the plug 50 after the plug 50 has been positioned and separated from the shank 15.

To place the plug 50 within the lowermost portion of the hole lower end 42, additional threads 45 may need to be added. As described previously, the original tapping of the hole 40 may leave a smooth wall section 48 along the lower end 42 of the fastener hole 40. To ensure the plug 50 can thread to the lower end 42 of the fastener hole, a bottoming tap can be inserted to cut additional threads 45 along the smooth wall section 48 as shown in FIG. 5. This ensures the plug 50 will bottom out as far into the fastener hole 40 as possible to retain sufficient room above the plug 50 for a subsequent fastener.

The threaded outer surface 53 of the plug 50 is configured to engage the female threads 45 of a fastener hole 40, while the shank 15 is configured to shear across the neck 25 and form a fracture surface 28 across the neck 25 when separating the shank 15 from the plug 50. To separate the shank 15 from the plug 50, the fastener head 30 is torqued above a threshold torque necessary to develop shear across the neck 25 sufficient to fail the part at this location.

To seal the hole 40 and separate the plug 50 from the shank 15, the hole 40 may first need to be prepared by adding additional threads to the lower end 42 of the hole 40 using the bottoming tap described above. The shearing fastener 10 is then inserted into the open upper end 41 of the fastener hole 40. The threaded outer surface 53 of the plug 50 is threaded onto the complementary threads 45 of the fastener hole 40. A tool is used to advance the plug 50 into the hole 40 by rotating the fastener head 30 until the plug 50 reaches the lower end 42 of the hole 40 and the end of the threads 45 therein. The plug 50 is thus bottomed-out in the threaded bore of the hole 40 as far as the threads 45 and geometry of the hole will allow.

The fastener head 30 is then torqued using a tool that applies a torque to the fastener head 30. The torque is transmitted from the fastener head 30 to the shank 15 and thus to the neck 25 and the plug 50. As the fastener head 30 is torqued, torsional stress develops in the shank 15 and the neck 25 at the intersection of the neck with the plug. Once the plug 50 has bottomed-out in the hole 40, the stress becomes concentrated in the neck 25 because of the radius 58 and the cross-sectional area of the neck 25. The torque applied to the fastener head results in a concentrated shear load across the neck 25, where the shear load will cause the material across the neck 25 to fail when a sufficient shear load develops. Therefore, a torque is applied to the fastener head 30 sufficient to shear the neck 25 to separate the shank 15 from the plug 50. Once the threshold torque is reached, the shear load across the neck 25 will fail the shearing fastener across the neck 25 and separate the shank 15 from the plug 50.

Once the threshold torque is applied and the neck 25 fails, the shank 15 is separated from the plug 50. The shank 15 can then be removed from the threaded bore of the hole 40. The plug 50 is retained within the threaded bore of the hole 40 along its lower end 42. The torque applied to the plug 50 ensures that the plug 50 will remain within the lower end 42 and will not become unseated. To further ensure this, an anaerobic thread locker material can be added to the threaded outer surface 53 of the plug 50 prior to the shearing fastener 10 being inserted into the hole 40. The anaerobic thread locker material cures in the absence of oxygen, and thus seals the threaded outer surface 53 of the plug 50 to the thread 45 of the hole 40 when the plug 50 is seated within the lower end 42.

Once seated, the plug 50 forms a seal along the lower end 42 of the hole 40. The lower surface 51 of the plug 50 extends across the bore of the hole 40, while the threaded outer surface 53 of the plug 50 and any additional thread-locking compound seals the lower end 42 of the hole. This prevents leakage of fluid from any interior passageways or cavities 108 in the work piece, which can occur in the event of material failure at the thin wall section 115 or leakage across the thin wall section 115. Thus, the work piece will not leak through the fastener hole 40 when a pressurized or non-pressurized fluid is present in an interior cavity 108 adjacent to the fastener hole 40.

As illustrated in FIG. 5, in a preferred embodiment, the fracture surface 28 of the neck 25 after being separated from the shank 15 is below an upper extent 81 of the plug 50. That is, the neck 25 is positioned along the upper surface 52 of the plug 50 within a recess 59, below an upper extent 81 of the plug 50. This ensures the fracture surface 28 is disposed within the interior of the plug 50 and no portion of the fracture surface 28 extends above the plug 50. This maximizes room within the bore of the hole 40 and minimizes the volume consumed by the plug 50.

In addition, the chamfered corners 54, 64 of the plug 50 prevent the plug 50 from catching burrs or imperfections within the threaded bore of the hole 40. This prevents the plug 50 from catching in the hole 40 before reaching the lower end 42. This would create a situation in which the plug 50 may have to be removed from the hole 40 to clean threads 45 of the hole 40, or may cause the installer to apply a greater torque to the fastener head 30 to overcome the obstruction. This can result in unnecessary stress developing in the neck 25 before the plug 50 bottoms out, thus creating the risk of premature failure across the neck 25 before the plug bottoms out. This would reduce the useable volume in the bore of the hole 40, necessitating a smaller fastener above the plug 50 or an operation to remove the plug 50. Neither of these is preferred.

Several advantages may be achieved with the shearing fastener of the present disclosure. First, the shearing fastener makes it possible to insert a plug 50 within the threaded bore of a fastener hole 40 to plug any potential leaks. Thus, entire work pieces can be saved and prevented from being scrapped if a fastener hole 40 is located too close to an internal cavity 108. A repaired work piece 200, as shown in FIG. 5, can be achieved by the process described above, where the shearing fastener 10 is inserted into the threaded bore of the fastener hole 40, bottomed out, and then torqued above a threshold torque to separate the plug 50 from its shank 15. The plug 50 seals the hole and prevents unwanted leakage through the fastener hole 40, and thus allows for a repaired work piece 200. This prevents material waste, prevents economic waste, and reduces lost time. The threaded bore of the fastener hole 40 becomes a sealed bore, and the work piece can be used as intended despite the proximity of the hole 40 to an interior cavity 108.

It will be apparent to those skilled in the art that various modifications and variations can be made to the shearing fastener of the present disclosure. Other embodiments will be apparent to those skilled in the art from consideration of the specification and practice of the disclosed shearing fastener. It is intended that the specification and examples be considered as exemplary only, with a true scope being indicated by the following claims and their equivalents.

What is claimed is:

1. A shearing fastener for sealing a fastener hole, comprising:
   a plug having an upper surface and a threaded outer surface;
   a shank having an upper end, a lower end, and a diameter;
   a transition section along the lower end of the shank that tapers inwardly and intersects the upper surface of the plug at a neck; and
   a fastener head disposed along the upper end of the shank,
   wherein the plug has an outer diameter that is greater than the diameter of the shank, and
   wherein the upper surface of the plug further includes a recess, and the transition section intersects the plug below an upper extent of the plug.

2. The shearing fastener of claim 1, further including:
   a radius extending around a periphery of the neck at the intersection between the transition section and the upper surface of the plug.

3. The shearing fastener of claim 2, wherein the radius further includes an acute angle between the transition section and the upper surface of the plug.

4. The shearing fastener of claim 1, wherein the plug is configured to engage female threads of a fastener hole, and the shank is configured to shear across the neck to separate the shank from the plug when the fastener head is torqued above a threshold torque.

5. The shearing fastener of claim 1, wherein:
   the outer surface of the plug further includes an upper corner and a lower corner that are chamfered.

6. The shearing fastener of claim 1, wherein:
   the neck has a smaller cross-sectional area than a cross-sectional area of the upper end of the shank.

7. A shearing fastener for sealing a fastener hole, comprising:
   a plug having an upper surface and a threaded outer surface;

a shank having an upper end, a lower end, and a diameter;

a transition section along the lower end of the shank that tapers inwardly and intersects the upper surface of the plug at a neck; and a fastener head disposed along the upper end of the shank, wherein the plug has an outer diameter that is greater than the diameter of the shank, wherein the upper surface of the plug further includes a recess, and the transition section intersects the plug below an upper extent of the plug, wherein the plug is configured to engage female threads of a fastener hole, and the shank is configured to shear and form a fracture surface across the neck to separate the shank from the plug when the fastener head is torqued above a threshold torque, and wherein the fracture surface being below the upper extent of the plug.

8. The shearing fastener of claim 7, further comprising:

a radius extending around a periphery of the neck at the intersection between the transition section and the upper surface of the plug.

9. The shearing fastener of claim 8, wherein the radius further includes an acute angle between the transition section and the upper surface of the plug.

10. The shearing fastener of claim 7, wherein the outer surface of the plug further includes an upper corner and a lower corner that are chamfered.

11. The shearing fastener of claim 7, wherein the neck has a smaller cross-sectional area than a cross-sectional area of the upper end of the shank.

12. A shearing fastener for sealing a fastener hole, comprising:

a plug having an upper surface and a threaded outer surface;

a shank having an upper end, a lower end, and a diameter;

a transition section along the lower end of the shank that tapers inwardly and intersects the upper surface of the plug at a neck;

a fastener head disposed along the upper end of the shank; and a radius extending around a periphery of the neck at the intersection between the transition section and the upper surface of the plug, wherein the plug has an outer diameter that is greater than the diameter of the shank, and wherein the upper surface of the plug including a recess extending around the periphery of the neck such that at least a portion of the neck is disposed below an upper extent of the plug, the recess including an angled surface extending downward from the upper extent of the plug to the radius.

13. The shearing fastener of claim 12, wherein the plug is configured to engage female threads of a fastener hole, and the shank is configured to shear across the neck to separate the shank from the plug when the fastener head is torqued above a threshold torque.

14. The shearing fastener of claim 12, wherein the radius further includes an acute angle between the transition section and the upper surface of the plug.

15. The shearing fastener of claim 12, wherein the outer surface of the plug further includes an upper corner and a lower corner that are chamfered.

16. The shearing fastener of claim 12, wherein the neck has a smaller cross-sectional area than a cross-sectional area of the upper end of the shank.

* * * * *